(12) United States Patent
Smits et al.

(10) Patent No.: US 9,268,079 B2
(45) Date of Patent: Feb. 23, 2016

(54) CANDLE LIGHT LED LIGHT BULBS (75) Inventors: Willem Hendrik Smits, Veldhoven (NL); Frans Hubert Konijn, Huizen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 9 days.

(21) Appl. No.: 14/238,298

(22) PCT Filed: Aug. 10, 2012

(86) PCT No.: PCT/IB2012/054079
§ 371 (c)(1),
(2), (4) Date: Feb. 11, 2014

(87) PCT Pub. No.: WO2013/027148
PCT Pub. Date: Feb. 28, 2013

(65) Prior Publication Data
US 2014/0204606 A1 Jul. 24, 2014

Related U.S. Application Data (60) Provisional application No. 61/525,342, filed on Aug. 19, 2011.

(51) Int. Cl.
*F21V 8/00* (2006.01)
*F21K 99/00* (2010.01)
*F21W 121/00* (2006.01)
*F21Y 101/02* (2006.01)

(52) U.S. Cl.
CPC ............... *G02B 6/0008* (2013.01); *F21K 9/52* (2013.01); *F21W 2121/00* (2013.01); *F21Y 2101/02* (2013.01)

(58) Field of Classification Search
CPC ...... G02B 6/0096; F21Y 2101/02; F21K 9/52; F21W 2121/00
USPC ...................... 362/249.02, 555, 558
See application file for complete search history.

(56) References Cited

U.S. PATENT DOCUMENTS

| | | | | |
|---|---|---|---|---|
| 6,350,041 B1 * | 2/2002 | Tarsa et al. | | 362/231 |
| 6,533,446 B2 * | 3/2003 | Chen et al. | | 362/559 |
| 6,803,607 B1 * | 10/2004 | Chan et al. | | 257/98 |
| 7,621,640 B2 * | 11/2009 | Lloyd | | 353/10 |
| 7,976,206 B2 * | 7/2011 | Wu et al. | | 362/555 |
| 8,714,784 B2 * | 5/2014 | Luo | | 362/311.12 |
| 2002/0114168 A1 * | 8/2002 | Pelka et al. | | 362/555 |
| 2003/0185005 A1 * | 10/2003 | Sommers et al. | | 362/240 |
| 2007/0053203 A1 * | 3/2007 | Graham | | 362/559 |
| 2010/0097821 A1 | 4/2010 | Huang et al. | | |
| 2010/0148650 A1 | 6/2010 | Wu et al. | | |

FOREIGN PATENT DOCUMENTS

| | | | |
|---|---|---|---|
| WO | 2010079436 A1 | 7/2010 | |
| WO | 2010079439 A1 | 7/2010 | |
| WO | 2010113113 A1 | 10/2010 | |

* cited by examiner

*Primary Examiner* — Peggy Neils
(74) *Attorney, Agent, or Firm* — Yuliya Mathis (57) ABSTRACT

A light bulb includes a light emitting device at the base of the bulb and a light guide (320) that guides the emitted light to a diffusion element (330) above the base of the bulb. The diffusion element is configured to diffuse the light so as to emulate the predominantly radial light distribution pattern produced by a candle. A variety of features for the diffusion element, as well as features of the base and bulb, are presented that enhance the candle-like effects.

17 Claims, 7 Drawing Sheets

View A-A
FIG. 3B

CANDLE LIGHT LED LIGHT BULBS

BACKGROUND OF THE INVENTION

This invention relates to the field of semiconductor light emitting devices, and in particular to bulbs that provide the appearance of candles.

Natural candle light is attractive. Electric candles are often preferred for a number of reasons, not the least of which is the risk of fire that is associated with an open flame.

Conventional incandescent bulbs are often designed to emulate candles because, like candles, they produce light by thermal emissions. However, incandescent bulbs are very inefficient with respect to energy utilization.

Semiconductor light emitting devices are highly efficient, but the design constraints associated with such devices, such as the need for a heat sink, limit their ability to emulate natural candle light.

When the wick of a natural candle is ignited, the light emanates from a 'point source' at the wick, suspended above the candle. Characteristically, less light is emitted above the wick than radially, around the wick. Conventional incandescent bulbs are configured to suspend the filament above the base of the bulb, thereby emulating the point source emission of a natural candle, and the bulb is shaped to reduce the amount of light emitted from the top of the bulb.

Semiconductor light emitting devices that may be used to emulate candle light, on the other hand, require heat sinks to dissipate the heat produced in order to extend the life of the light emitting device (LED). This heat sink requirement hinders the use of such devices as emulators of candle light. WO2010/079436, "LIGHT SOURCE WITH LEDS, LIGHT GUIDE AND REFLECTOR", published 15 Jul. 2010 for Boonekamp et al. discloses the use of a light guide and reflector to elevate the apparent light source above the base, and is incorporated by reference herein.

Figure 1:
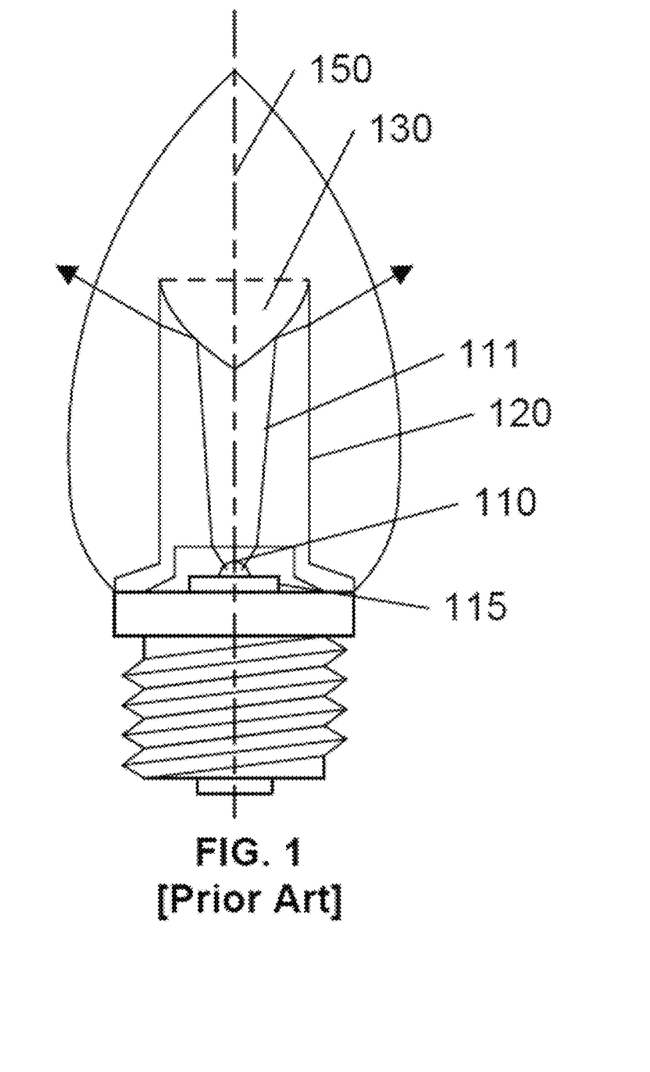
FIG. 1 illustrates an example prior art semiconductor light emitting bulb that emulates candle light.

As illustrated in FIG. 1, the LED(s) 110 is mounted on a heat sink 115 in the base of the bulb, and a light guide 120 is used to direct the light from the LED(s) 110 to a reflector 130 that is situated above the base. The reflector 130 is generally conical, with the apex of the cone pointed toward the LED. In this manner, the light from the reflector appears to be produced by a light source above the base of the bulb in a predominantly radial direction relative to a central axis 150 of the bulb. The profile of the reflector 130 may be concave or convex, depending upon the desired light distribution. Additionally, the reflector 130 may include an interference or diffusion coating, and may allow for some transmission through the reflector.

Although the use of a conic reflector provides the appearance of a radial point source of light above the base of the bulb, it does not truly emulate the appearance of a natural candle light.

Other techniques are known for emulating candle light. USPA 2010/0097821, "LIGHT EMITTING DIODE-BASED LAMP HAVING A VOLUME SCATTERING ELEMENT", published 22 Apr. 2010 for Huang et al., for example, discloses a light guide that guides the LED light to a spherical scattering element that includes particles suspended in a transparent base material. By controlling the size, refractive index, and density of the particles, different light patterns can be achieved; a larger density of particles will produce more reflections, and the majority of light will be reflected downward.

Although the use of a scattering device provides for a more 'natural' light output, it does not provide the predominantly radial emanation desired for emulating candle light.

SUMMARY OF THE INVENTION

It would be advantageous to provide a light source that appears similar to a natural candle light source. It would also be advantageous if the light source could be mounted on a heat sink that is remote from the apparent source of the light.

These advantages, and others, can be realized by a bulb that includes a light emitting device at the base of the bulb and a light guide that guides the emitted light to a diffusion element above the base of the bulb that diffuses the light so as to emulate the predominantly radial light produced by a candle. A variety of features for the diffusion element are presented herein, as well as features of the base and bulb that enhance the candle-like effects.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

In the prior art light emitting bulb of FIG. 1, a conic element 130 reflects the light from the light emitting device 110 in a radial direction, thereby emulating a radial light source. However, the resultant uniformity of the emitted light detracts from the intended emulation of a natural candle light.

USPA 2010/0097821, referenced above, provides for control of the amount of light that is emanated upward and downward, but does not provide a predominantly radial light output with respect to the central axis of the light bulb.

The applicants have recognized that candles produce a light output with characteristic features. In addition to the fact that the light is primarily emanated radially, the source of the light is not truly a 'point' source, per se. Rather, because the light is produced along the length and around the perimeter of the burning wick, the light is more diffused, with some light naturally emanating upward and downward. Additionally, the base of the candle is generally dark, being in the shadow of the candle itself. Another characteristic aspect of candle light is the teardrop-like shape of the flame. The bottom of the flame appears bright and broad, and tapers to a dimmer tip at the top of the flame.

Figure 2:
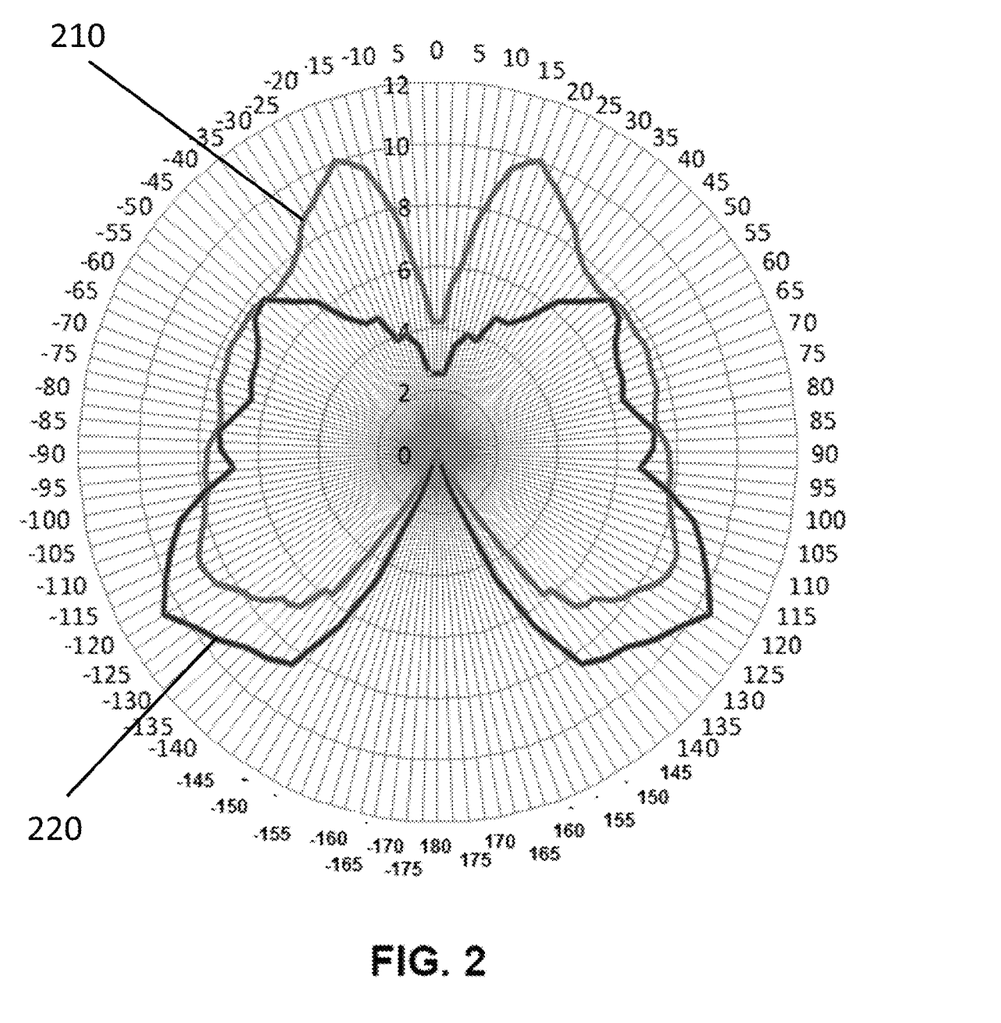
FIG. 2 illustrates example light distribution plots exhibiting substantially radial emissions.

FIG. 2 illustrates two angular plots 210, 220 of light distribution patterns that exhibit predominantly radial emanations of light, similar to light from a candle. The zero degree point is atop the light bulb, the 180° point is below the light bulb, along the center axis of the light bulb, and the 90° and 270° points are perpendicular to the center axis. Both plots 210 and 220 illustrate a relatively small amount of light being visible from above the light bulb, none from directly below the light bulb, and a substantial amount of light when viewed from the side. The structure and composition of the particular bulb will determine the particular light distribution pattern, as detailed further below. In these examples, the light bulb that produced plot 210 is configured to allow more light to emanate from the top of the bulb than the bulb that produced plot 220. In the bulb corresponding to plot 220, more light is reflected in a downward direction, while still maintaining a predominantly radial distribution of light.

FIGS. 3A-3E illustrates an example embodiment of a candle-emulating light bulb. Rather than a primarily reflective element at the top of the light guide, as disclosed in WO2010/079436, the light bulb of FIG. 3A includes a solid diffusion element that appears to 'glow'. The shape and substance of the diffusion element 330 are selected to provide a diffuse light output that is predominantly radial with respect to the central axis 350 of the light bulb, and includes characteristics that are typical of a candle light. Although the profile of the diffusion element 330 is illustrated as having substantially linear surfaces, one of skill in the art will recognize that curved surfaces may be used to provide the desired concentration or dispersion of the light being reflected and refracted by the diffusion element 330.

Figure 3A:
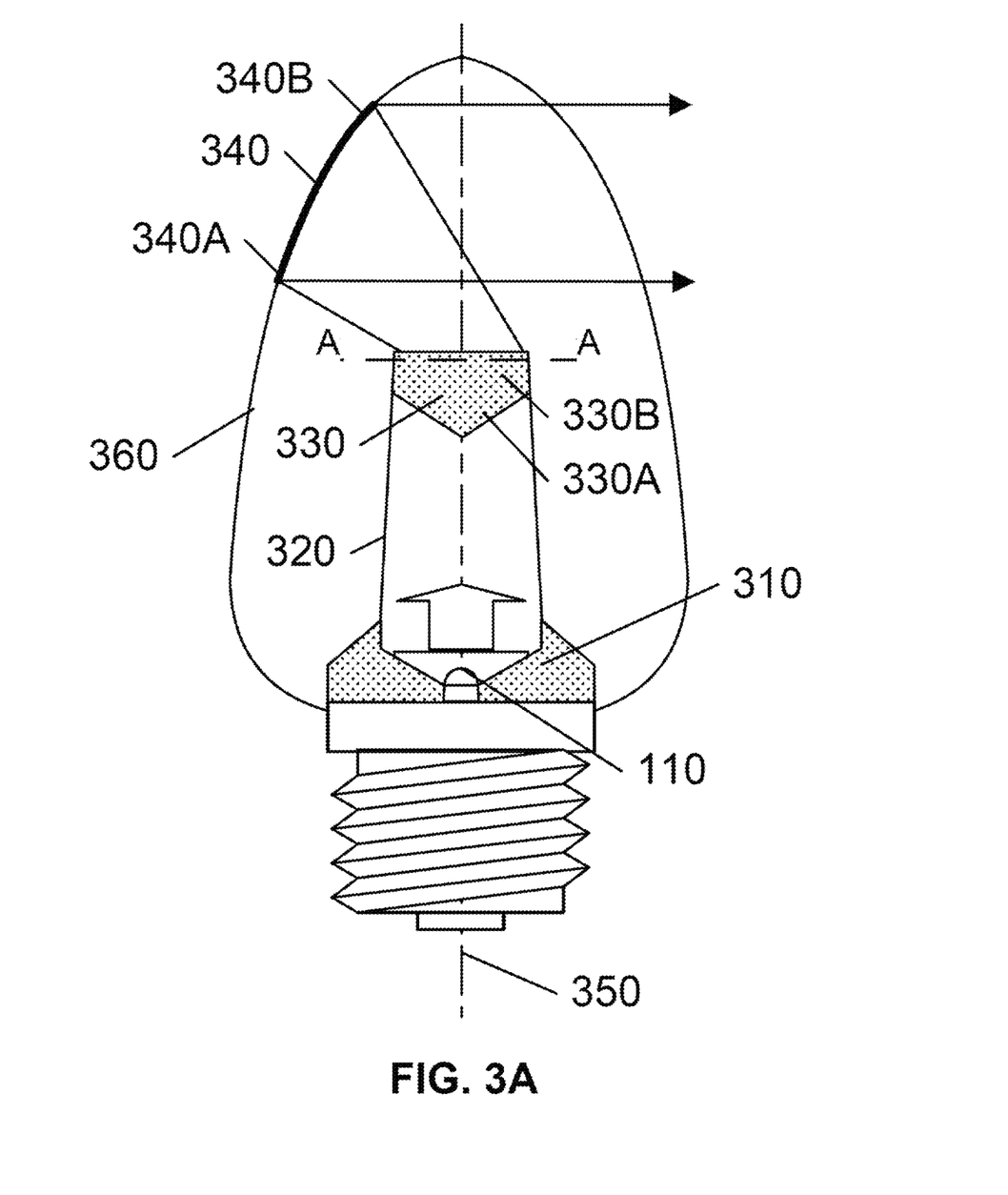
FIGS. 3A-3E illustrates an example lamp bulb that provides a diffused emission pattern that is predominantly radial with respect to the central axis of a light bulb.
Figure 3B:
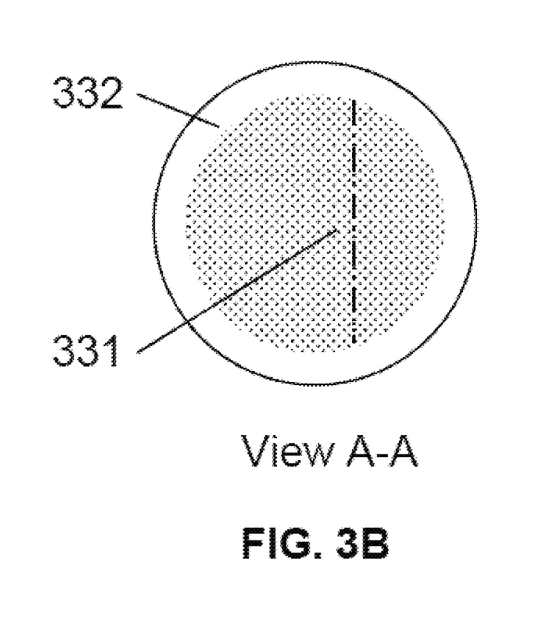
Figure 3C:
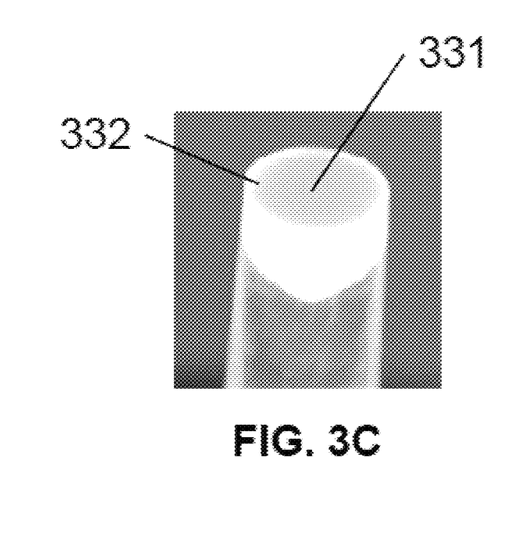

Of particular note, the example diffusion element 330 includes a conic portion 330A and a cylindric portion 330B. This combination provides a unique light output pattern that approximates that of a candle light. As illustrated in the drawing of FIG. 3B and the photo of FIG. 3C, the perimeter area 332 of the cylindric portion 330B will be substantially brighter than the center area 331, producing a 'halo' effect. The decreasing depth of the diffusion material as the distance from the center increases in the conic portion 330A causes the light output to be greater as the distance from the center increases. This halo effect increases the perception of a candle-like light source, with the light being brightest at the perimeter of the top of the light guide. The perimeter brightness emulates the light distribution pattern of a burning wick.

The diffusion element 330 need not include both a conic element and a cylindric element. The cylindric element provides 'length' to the light distribution, akin to the length of a burning wick; a diffusion element 330 without a cylindric element may appear as a candle with a very short wick. The conic element provides the decreasing depth of diffusion material as the distance from the center increases, and produces the aforementioned halo effect. Other techniques for achieving a halo effect may be used, such as the use of opaque material in the center of a diffusion cylinder, the use of different concentrations/densities of diffusion material in a diffusion cylinder, and so on. Additionally, the light guide 320 could be structured to direct light away from the center, toward the outer edges of a diffusion element. These and other techniques for creating a candle light emulating diffusion element 330 will be evident to one of skill in the art in view of this disclosure.

Figure 3D:
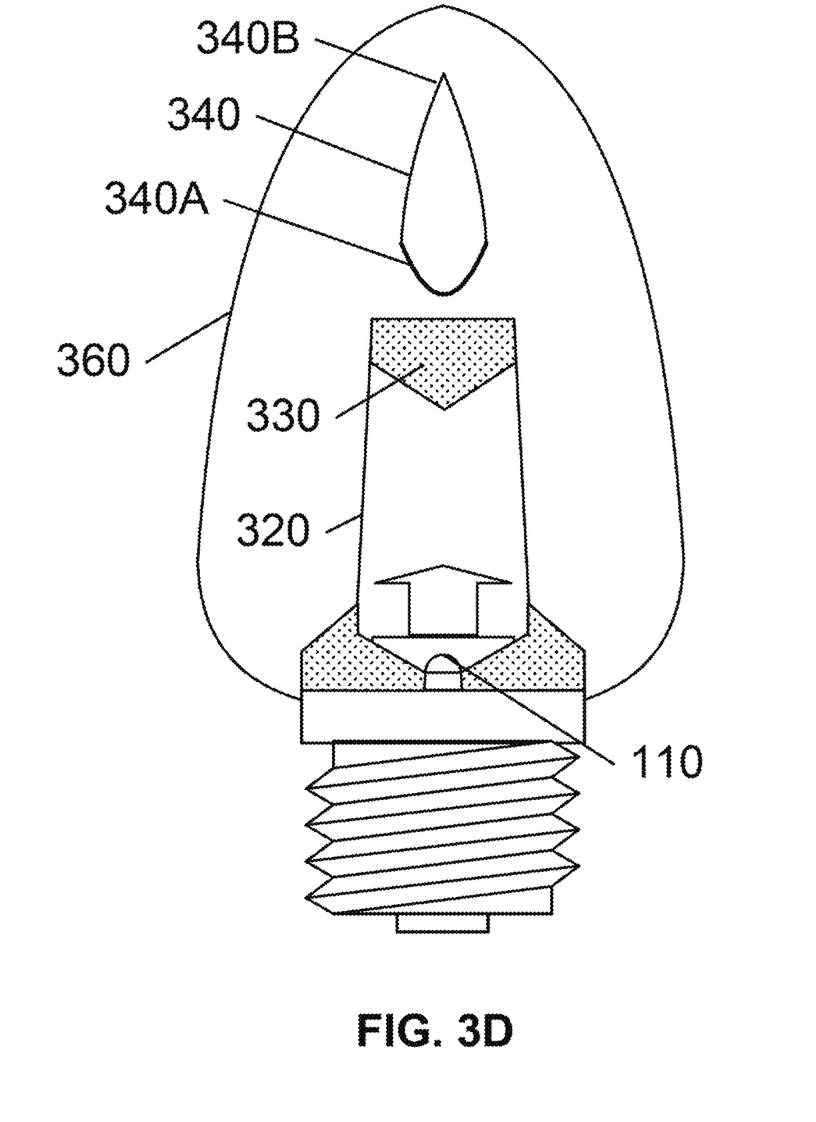
Figure 3E:
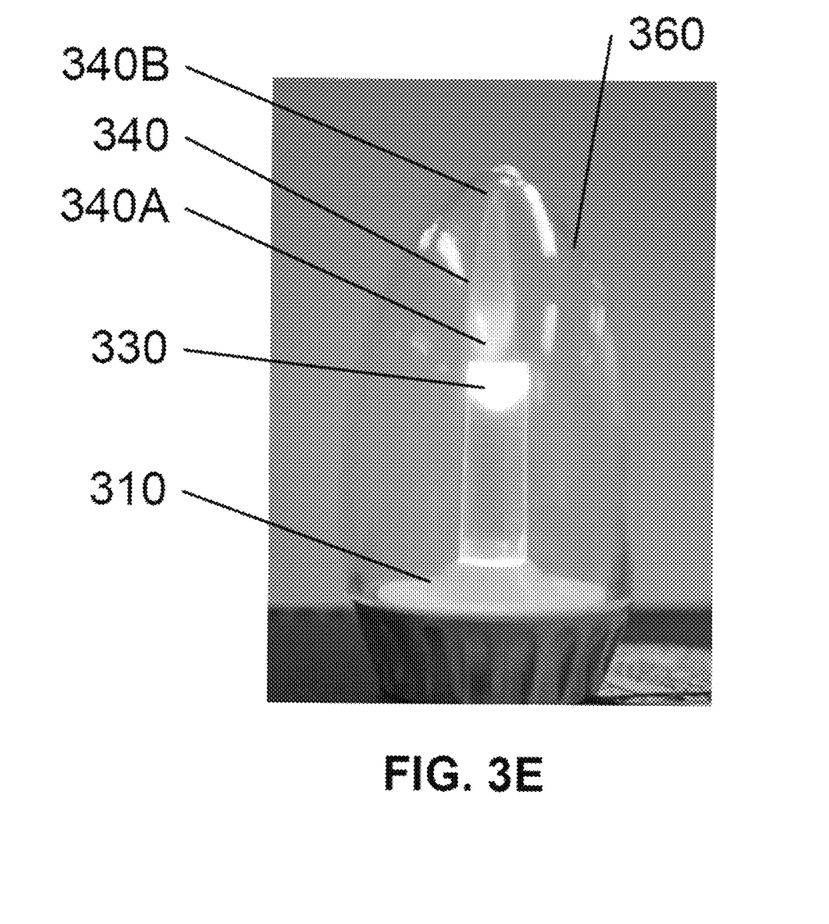

Also illustrated in FIGS. 3A, 3D, and 3E is a reflective layer 310 that surrounds the light guide at the base of the bulb, and preferably extends as far as practical into the LED chamber, to reflect the light into the light guide and prevent light leaks that are common at the juncture of the light guide and the base. Depending upon the desired effect, the visible upper surface of this layer 310 may be reflective, semi-reflective, or non-reflective. The thickness of this layer 310 may be increased or decreased to control the amount of light leakage, also depending upon the desired visual effect.

In the embodiment of FIGS. 3A-3E, the envelope 360 of the bulb is shaped to enhance the reflection of this halo effect, creating reflections, or 'ghost images' 340 that appear similar to a teardrop shaped candle flame. These reflections will be visible from any angle around the bulb, but, for ease of understanding, FIG. 3A illustrates a 'side view' of the reflection phenomenon, while FIG. 3D illustrates a 'front view' of this reflection phenomenon. That is, FIG. 3A illustrates how the light is reflected from the curved surface, whereas FIG. 3D illustrates how the reflection will appear on the curved surface of the envelope 360.

The circular halo is reflected from the curved surface of the envelope 360 so as to produce an elongated reflected image that is wider and brighter at the bottom 340A, and, with a compound curve, forms a narrow tip at the top 340B. The bottom 340A is brighter because it is closer to the edge of the diffusion element 330, and top 340B is narrower because the bulb narrows at the top. This reflected ghost image 340 thus emulates the characteristic teardrop shape of a candle flame. FIG. 3E is a photograph of an example embodiment, with the resultant teardrop shaped reflection 340 produced by the combination of a halo-producing diffusion element 330 and a tapered envelope 360.

The appearance of the ghost image 340 may be made more prevalent by reducing the intensity of the light emitted from the sides of the diffusion element 330. For example, an opaque or reflective coating may be applied to the perimeter of the diffusion element, and perhaps the entire light guide 320, so that the light exits only from the halo area 332 at the top of the diffusion element 330, and is reflected radially as the teardrop shaped ghost image 340 from the envelope 360.

Figure 4:
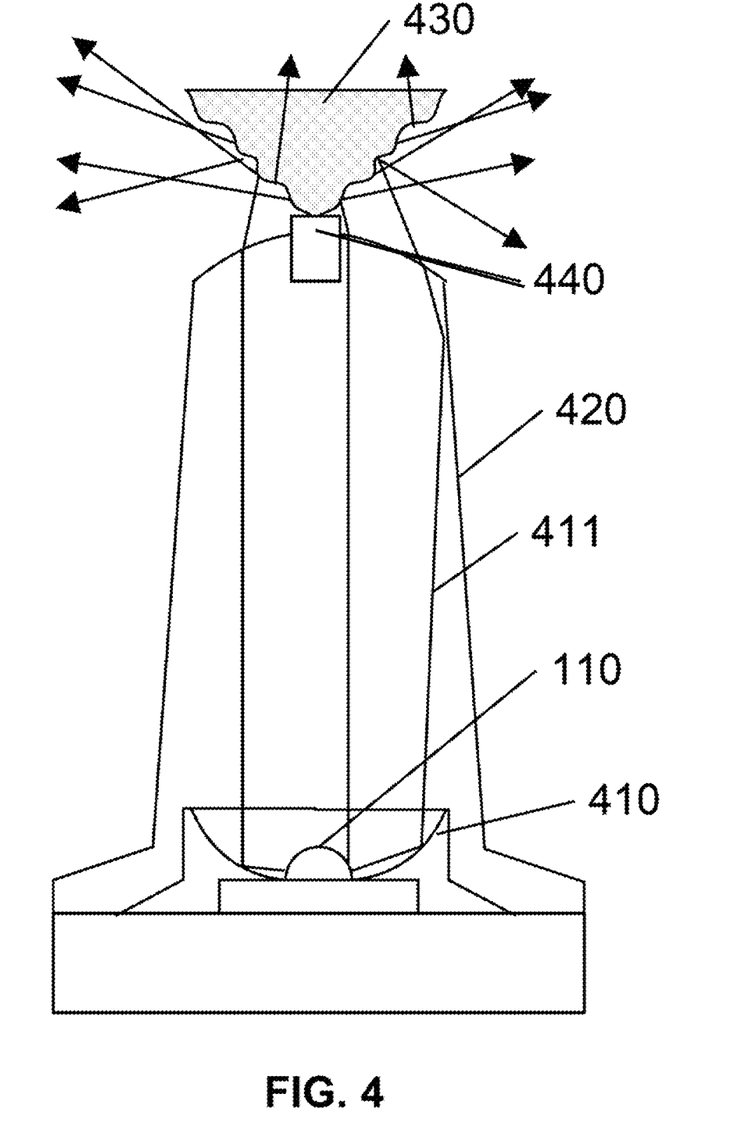
FIG. 4 illustrates another example structure that provides a diffused emission pattern that is predominantly radial with respect to the central axis of a light bulb.

FIG. 4 illustrates another example structure that provides a diffused emission pattern that is predominantly radial with respect to the central axis of a light bulb. FIG. 4 illustrates a number of features that enhance the performance of the lamp, and one of skill in the art will recognize that some or all of these features may be included in any embodiment, including the example embodiment of FIGS. 3A-3E.

In this example embodiment, the diffusion element 430 is separated from the light guide 420, and the light guide 420 includes a convex top surface 440 that serves to direct the light toward the diffusion element 430. The base of the lamp also includes a reflective surface 410 surrounding the light emitting device 110 to collate the light output toward the diffusion element 430. As also illustrated in FIG. 4, the light guide 420 is preferably tapered to direct 'tangential' light rays 411 toward the conic cavity. The light guide 420 may be made of PMMA (Polymethyl methacrylate) or similar material.

To enhance the diffusion of the light, the diffusion element 430 may include an irregular surface area that serves to provide an irregular diffusion pattern, and to reflect the light in various directions. In this embodiment, the diffusion element 430 is a conic structure with irregular side surfaces. Note that the figure is not drawn to scale, and the irregularities are somewhat exaggerated in this figure, for ease of illustration and understanding. A slight sinusoidal pattern on the surface of the diffusion element 430 will generally be sufficient to provide a diffused distribution of light within a defined opening angle predominantly in the radial direction. Although the profile of the diffusion element 430 is illustrated as having a conic structure with a slight sinusoidal pattern on the irregular side surfaces, one of skill in the art will recognize that other curved surfaces may be used to provide the desired concentration or dispersion of the light being reflected and refracted by the diffusion element 430.

The diffusion element 430 may a hollow structure that is lined with a reflective or semi-reflective material, or it may be a solid cone of diffusing material, such as a diffuse white resin with a reflectivity of about 95% and a lambertian distribution. That is, the diffusion element 430 may range from a specular mirror reflector with an irregular surface that reflects and diffuses all of the light in a predominantly radial direction to a diffuse scattering reflector that allows some light to propagate through the irregular surface to escape upwards, further emulating the light output characteristics of a burning candle, as detailed above.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed devices or portions thereof may be combined together or separated into further portions unless specifically stated otherwise;

f) no specific sequence of acts is intended to be required unless specifically indicated; and g) the term "plurality of" an element includes two or more of the claimed element, and does not imply any particular range of number of elements; that is, a plurality of elements can be as few as two elements, and can include an immeasurable number of elements.

The invention claimed is:

1. A light bulb comprising:
   a base in which a light emitting device is situated,
   a light guide that is configured to guide light emitted from the light emitting device toward an interior of the light bulb, and
   a diffusion element, having a continuous top surface, that is configured to receive the light from the light guide and reflect and diffuse the light such that a light output in an upward direction from the diffusion element at a perimeter area of the continuous top surface of the diffusion element is substantially brighter than at a center area of the continuous top surface of the diffusion element,
   wherein the light is output from the light bulb predominantly in a radial direction relative to the central axis of the light bulb.

2. The light bulb of claim 1, including an envelope that includes a surface that is curved such that a reflection of the light emitted by the diffusion element on the surface of the envelope is substantially teardrop shaped.

3. The light bulb of claim 2, wherein a lower section of the reflection appears significantly brighter than an upper section of the reflection.

4. The light bulb of claim 1, wherein a perimeter of the diffusion element is substantially brighter than an interior of the diffusion element.

5. The light bulb of claim 1, wherein the diffusion element includes diffusion material within a cavity in the light guide.

6. A light bulb comprising:
   a base in which a light emitting device is situated,
   a light guide that is configured to guide light emitted from the light emitting device toward an interior of the light bulb, and
   a diffusion element, having a continuous top surface, that is configured to receive the light from the light guide and reflect and diffuse the light such that a light output in an upward direction from the diffusion element at a perimeter area of the continuous top surface of the diffusion element is substantially brighter than at a center area of the continuous top surface of the diffusion element,
   wherein the light is output from the light bulb predominantly in a radial direction relative to the central axis of the light bulb,
   wherein the diffusion element is separate from the light guide.

7. The light bulb of claim 6, wherein the diffusion element includes an irregular surface.

8. The light bulb of claim 1, wherein the diffusion element includes a conic shape.

9. The light bulb of claim 8, wherein the diffusion element includes a cylindric shape.

10. The light bulb of claim 1, wherein the base includes a reflective layer that surrounds a lower section of the light guide.

11. The light bulb of claim 1, wherein the base includes a reflective layer below the light guide.

12. The light bulb of claim 1, wherein the diffusion element is a specular mirror reflector.

13. The light bulb of claim 1, wherein the diffusion element is a diffuse scattering reflector.

14. The light bulb of claim 1, wherein the diffusion element includes a reflective or semi-reflective coating.

15. A light bulb comprising:
    a base in which a light emitting device is situated,
    a light guide that is configured to guide light emitted from the light emitting device toward an interior of the light bulb, and
    a diffusion element, having a continuous top surface, that is configured to receive the light from the light guide and reflect and diffuse the light such that a light output in an upward direction from the diffusion element at a perimeter area of the continuous top surface of the diffusion element is substantially brighter than at a center area of the continuous top surface of the diffusion element,
    wherein the light is output from the light bulb predominantly in a radial direction relative to the central axis of the light bulb,
    wherein the diffusion element comprises a solid cylindric portion disposed on top of a solid conic portion.

16. The light bulb of claim 15, wherein the solid cylindric portion comprises the top surface that is comprised of the perimeter area and the center area.

17. The light bulb of claim 1, wherein the diffusion element comprises a solid structure of diffusing material.

* * * * *